United States Patent
Cummings et al.

(10) Patent No.: US 6,591,308 B1
(45) Date of Patent: Jul. 8, 2003

(54) COMPUTER INPUT DEVICE

(75) Inventors: John J. Cummings, Peoria, AZ (US); Robert E. Helmbrecht, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/476,469

(22) Filed: Dec. 30, 1999

(51) Int. Cl.$^7$ ................................................. G06F 3/00
(52) U.S. Cl. .......................... 710/1; 710/18; 710/72; 345/156
(58) Field of Search ................................ 710/1, 2, 7, 15, 710/20, 62, 64, 72, 73, 100, 101, 103, 102, 12, 17, 18, 33, 36; 345/156, 157, 168; 712/225

(56) References Cited

U.S. PATENT DOCUMENTS

| | | | | |
|---|---|---|---|---|
| 5,672,852 A | * | 9/1997 | Fukuzaki et al. | 178/19 |
| 5,805,833 A | * | 9/1998 | Verdum | 710/101 |
| 5,982,358 A | * | 11/1999 | Fleming, III | 345/168 |
| 6,020,877 A | * | 2/2000 | Smith | 345/157 |
| 6,107,990 A | * | 8/2000 | Fleming, III | 345/157 |
| 6,219,037 B1 | * | 4/2001 | Lee | 345/167 |
| 6,373,463 B1 | * | 4/2002 | Beeks | 345/156 |
| 6,392,634 B1 | * | 5/2002 | Bowers et al. | 345/163 |

* cited by examiner

*Primary Examiner*—Jeffrey Gaffin
*Assistant Examiner*—Rijue Mai

(57) ABSTRACT

A portable computer input device includes a housing capable of accommodating a plurality of types of pointing devices. A pointing device partially housed in the housing produces a cursor control signal that controls the movement of a cursor on a display device coupled to a computer, and the pointing device is one of the plurality of types of pointing devices. A memory housed in the housing stores user preferences such as pointing device preferences and display device preferences. A data port attached to the housing communicatively couples the computer input device to the computer.

12 Claims, 2 Drawing Sheets

COMPUTER INPUT DEVICE

BACKGROUND OF THE INVENTION

1. Technical Field

The present invention generally relates to computer input devices and, more particularly, to computer input devices that include a pointing device to control the movement of a cursor on a display device.

2. Background Information

Computers are used in an increasing number of applications to perform a variety of different functions. A computer is defined broadly as any type of electronic processing device such as a general-purpose computer, a special purpose computer, a microprocessor, or a microcontroller. Examples of applications in which computers are used include offices, factories, vehicles, airport traffic control towers, televisions, and movie theatres, just to name a few. Vehicles include automobiles, trucks, aircraft, etc., while aircraft include airplanes, helicopters, spacecraft, etc. In many of these applications, a user utilizes the computer to perform a function by inputting information to the computer. For example, in an aircraft, a pilot inputs information to the aircraft computer to control the aircraft.

To enable a user to input information to the computer, a display device, such as a cathode ray tube (CRT) or a liquid crystal display (LCD), typically is coupled to the computer. The display device may include a plurality of CRT's and/or LCD's, with each CRT and LCD referred to as a display. A computer input device typically is also coupled to the computer to allow a user to enter information, control a cursor, and select items, all of which are displayed on the display device.

Many computer input devices, such as a computer mouse, include a pointing device that enables a user to control the movement of the cursor on the display device. Examples of types of pointing devices include a trackball, a joystick, and a touchpad. Typically, a computer is interfaced to a computer input device having a particular type of pointing device. Some of the computer input device operational characteristics, such as the speed of the cursor movement across the display device, may be selected as preferences by the user and stored in the computer's memory.

While many types of pointing devices are available, many computer users prefer one type of pointing device over others. This may happen, for example, because the user becomes familiar and comfortable with using the type of pointing device that is interfaced to the computer the user utilizes most often. With the increasing number of applications in which a user performs functions by utilizing a computer, the user will invariably be faced with using computers interfaced to types of pointing devices that the user is neither familiar nor comfortable with. This will lead to inefficient use of the computer and less than optimum performance.

In addition, users become familiar and comfortable with their preferred computer input device operational characteristics, such as the speed of the cursor movement across the display device. Thus, each time the user utilizes a particular computer input device for the first time, the user will have to select her preferences for storage in the computer if the user desires maximum familiarity and comfort with the computer input device. Also, if multiple user's consecutively utilize the same computer and associated computer input device, and some of the users have differing preferences, then each time a user utilizes the computer input device, the user may have to re-select her preferences for storage in the computer.

Thus, there is a need for a computer input device that can accommodate various types of pointing devices, that can store preferences of the user, and that the user can carry from one computer to another.

SUMMARY OF THE INVENTION

The present invention overcomes the foregoing problems and achieves an advance in the art by providing a portable computer input device that can accommodate a plurality of types of pointing devices and that has storage capability.

In accordance with an aspect of the present invention, a portable computer input device includes a housing capable of accommodating a plurality of types of pointing devices, a pointing device that is one of the plurality of types of pointing devices, a memory for storing preferences of the user, and a data port for communicating signals between the computer input device and a computer.

DETAILED DESCRIPTION

Figure 1:
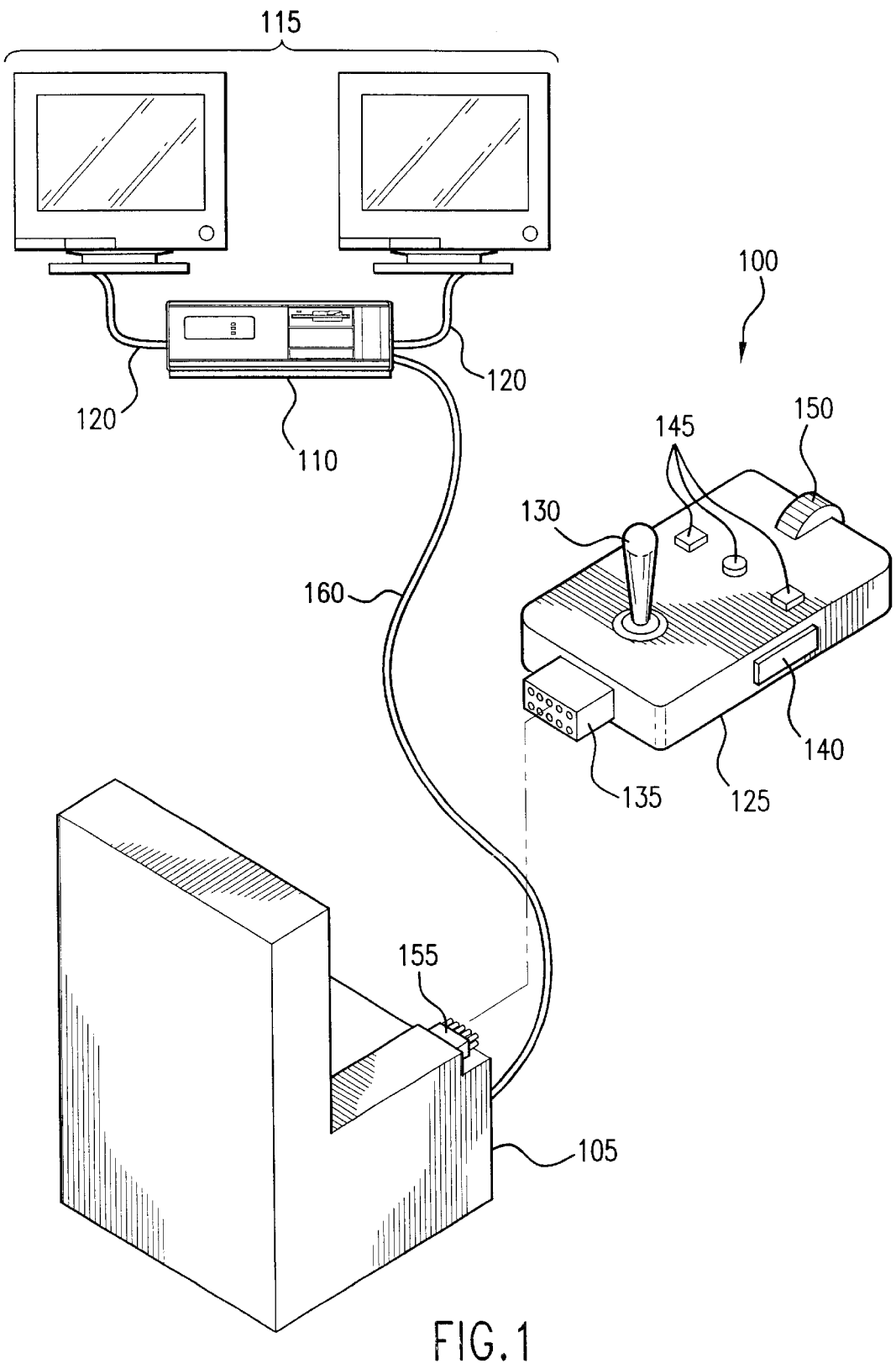
FIG. 1 illustrates a perspective view of a computer input device in an exemplary environment in accordance with an aspect of the present invention.

FIG. 1 illustrates a perspective view of a computer input device 100 in an exemplary environment in accordance with an aspect of the present invention. The exemplary environment includes a user's chair 105, a computer 110, and a display device 115. The computer 110 and the display device 115 are electrically coupled by a cable 120. A cable 120 is shown for illustrative purposes only; any type of coupling may be used between the computer 110 and the display device 115.

The computer input device 100 includes various combinations of a housing 125, a pointing device 130, a data port 135, an enter device 140, a display select device 145, and a parameter select device. 150. All of the previous components may not be included in a particular computer input device 100. The computer input device 100 is portable, thereby enabling a user to carry the computer input device 100 from place to place with relative ease. Thus, the computer input device 100 typically is of appropriate size and weight to be carried in a brief case, backpack, purse, pocket, etc.

The pointing device 130, the enter device 140, the display select device 145, and the parameter select device 150 are partially housed in the housing 125. The portion of each device residing outside of the housing 125 is accessible to a user. The data port 135 is attached to the housing 125. The data port 135 communicatively couples the computer input device 100 to the computer 110, thereby enabling signals to pass between the computer input device 100 and the computer 110. As illustrated in FIG. 1, the data port 135 is a connector. The connector detachably couples to a mating connector 155 that is coupled to the computer 110 through a computer input device cable 160. Even though the data port 135 is depicted as a connector, any type of data port 135 can be used, such as an RF, infrared, or optical transmitter/receiver. Thus, a compatible transmitter/receiver could reside on the computer 110 or the display device 115, for example. In that case, the mating connector 155 and the computer input device cable 160 would not be necessary.

The pointing device 130 is illustrated as a joystick, however, there are a variety of types of pointing devices 130 that can be used in addition to joysticks, such as trackballs and touchpads. There can also be variety among each type of pointing device 130. For example, a joystick can have one of several different shapes and sizes. The housing 125 can accommodate a plurality of types of pointing devices 130, including varieties among each type. For example, a trackball can replace the joystick of the pointing device. 130 in FIG. 1. As a further example, the trackball can be replaced with a larger trackball. The portability of the computer input device 100 in conjunction with a housing 125 that can accommodate a plurality of types of pointing devices 130 enables a user to choose a computer input device 100 that includes the user's favorite type of pointing device 130, and to carry that computer input device 100 from one computer to another. For example, a pilot can carry his favorite computer input device 100 from one aircraft to another and use that computer input device to input information to the aircraft's computer 110, thereby controlling the aircraft.

In operation, the computer input device 100 is coupled to the computer 110 through the data port 135. Examples of the data port 135 include a detachably coupled connector, or an RF, infrared, or optical transmitter/receiver as discussed above. Examples of the coupling path from the computer input device 100 to the computer 110 include wired and wireless. The housing 125 may be detachably affixed to a base using mounting hardware not shown. In FIG. 1, the base is depicted as the user's chair 105. Another example of a base includes a console next to the user's chair 105. The base is substantially fixed relative to the user while the user is utilizing the computer input device 100. Thus, in FIG. 1, during use, the computer input device 100 is affixed to the user's chair 105 using the data port 135 and/or optional mounting hardware not shown. In turn, the user's chair 105 is substantially fixed relative to the user while the user is using the computer input device I 00. This feature may be desirable in turbulent environments such as vehicles to stabilize the computer input device 100 relative to the user.

Continuing with the operation of the computer input device 100, the user manipulates the pointing device 130 to control the movement of the cursor on the display device 115. The user utilizes the enter device 140 to select an item on the display device 115. The enter device 140 may be a push-button switch or any other type of device that can be manipulated by the user.

The user can use the display select device 145 to select an area of the display device 115 in which the cursor will move. This may be used, for example, to move the cursor quickly from an area on one side of the display device 115 to an area on an opposite side of the display device 115, eliminating the need to use the pointing device to drag the cursor across the display device 115. An example of the display select device 145 includes a plurality of push-button switches. Three switches are illustrated for the display select device 145 in FIG. 1 as an example. Each switch may be assigned to an area of the display device 115. For example, the items displayed on the display device 115 may be organized functionally. For instance, items that control the fuel system of the aircraft, such as a graphical depiction of the aircraft's fuel tanks, may be displayed in the upper left quadrant of the display device 115, while items that control radio frequency tuning in the aircraft, such as a graphical depiction of the available radio frequencies, may be displayed in the lower right quadrant of the display device 115. Thus, to control the fuel system, the pilot can depress one of the switches in the display select device 145, enabling the pilot to move the cursor in the upper left quadrant of the display device 115. To control radio frequency tuning, the pilot can depress another one of the switches in the display select device 145, enabling the pilot to move the cursor in the lower right quadrant of the display device 115. As another example, the display device 115 may be include a plurality of displays as shown in FIG. 1, with each display devoted to particular functional items. Thus, to control the fuel system, the pilot can depress one of the switches in the display select device 145, enabling the pilot to move the cursor in one of the displays of the display device 115. To control radio frequency tuning, the pilot can depress another one of the switches in the display select device 145, enabling the pilot to move the cursor in another one of the displays of the display device 115. Of course, each of the switches could be programmed for other uses depending upon operating environment, application, user preference, etc.

The user can use the parameter select device 150 to scroll through a predetermined list of parameters on the display device 115. The entire list or only a portion of the list can appear on the display device 115. For example, a single parameter may appear on the display device 115, with the displayed parameter changing as the user scrolls through the list. An example of a parameter select device 150 includes a rotary switch such as a thumbwheel switch. Thus, the pilot in an aircraft can, for example, use the parameter select device 150 to scroll through a list of radio frequencies. Once the pilot has found the radio frequency of interest, he can, for example, use the enter device 140 to select that frequency.

Figure 2:
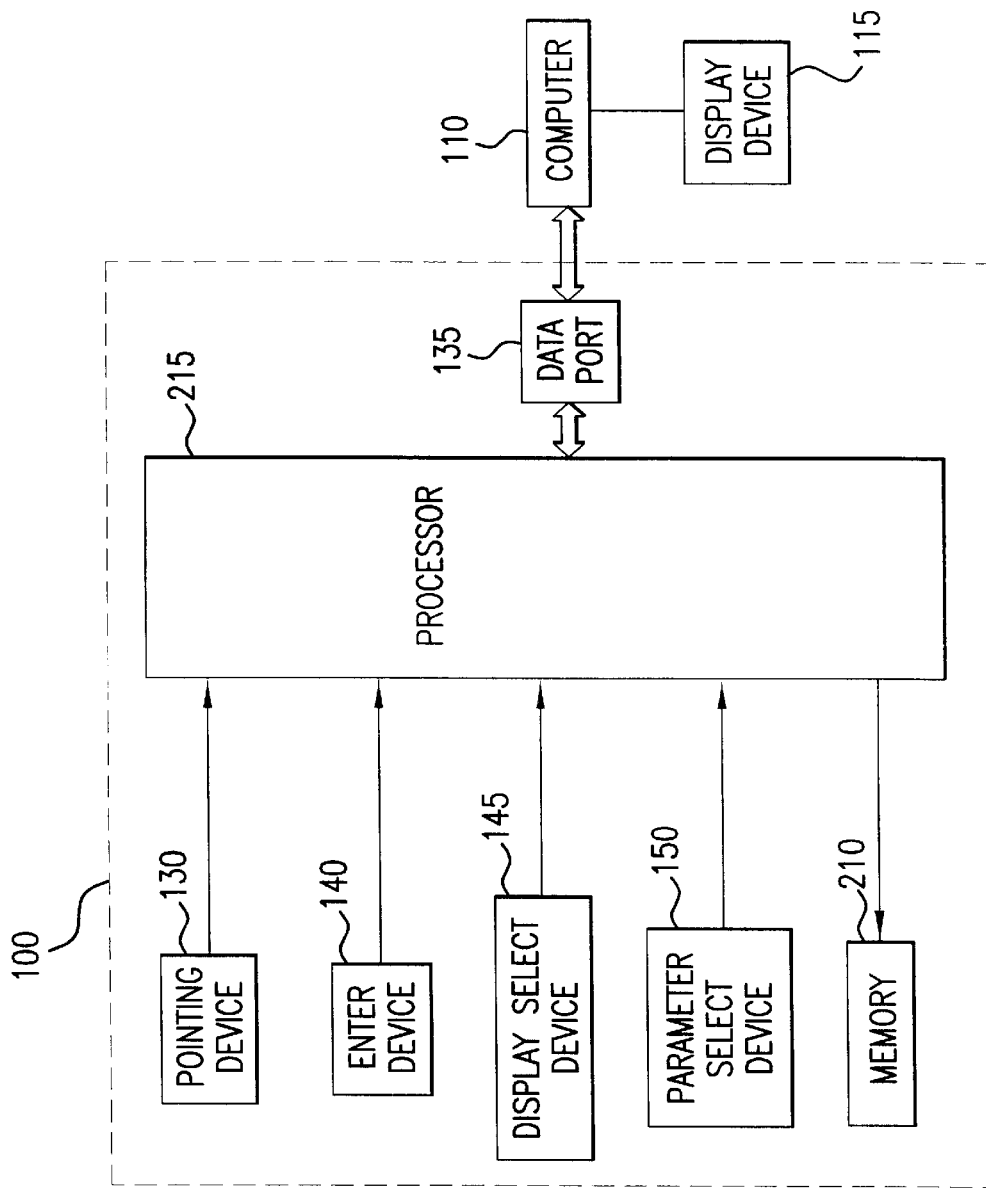
FIG. 2 illustrates a block diagram of the computer input device in accordance with an aspect of the present invention.

FIG. 2 illustrates a block diagram of the computer input device 100 in accordance with an aspect of the present invention. The computer input device 100 includes various combinations of the pointing device 130, the enter device 140, the display select device 145, the parameter select device 150, and a memory 210, all of which are coupled to a processor 215 that is coupled to the data port 135. All of the previous components may not be included in a particular computer input device 100. The processor 215 may perform many functions such as input/output (I/O) conversion, running a preference setup routine, and any other desirable processing functions. The processor 215 is illustrated as a component of the computer input device 100, however, some or all of the functions performed by the processor may be remote from the computer input device 100.

The pointing device 130 produces a cursor control signal that controls the movement of the cursor on the display device 115. The cursor control signal may be an analog signal from a transducer associated with the pointing device 130 or it may be a digital signal from additional circuitry associated with the pointing device 130. Also, depending on the amount of circuitry associated with the pointing device 30, the cursor control signal may be an exact indication of the cursor movement, or the cursor control signal may have to be adjusted based on the type of pointing device 130. In the latter case, a signal identifying the type of pointing device 130 is coupled to the processor 215 along with the cursor control signal. Thus, the pointing device 130 may include varying amounts of additional circuitry, and typically includes a transducer.

The signal that identifies the type of pointing device 130 may be periodic to facilitate hot swappability of the computer input device 100. In other words, with the computer 110 powered up and running, user A can uncouple his computer input device 100 from the computer 110, and then user B can couple his computer input device 100 to the computer 110 without rebooting the computer 110 and without damaging the interface between the computer input device 100 and the computer 110. Software running on the computer 110 can be designed to detect the swap of the computer input device 100, detect and process the signal that identifies the type of pointing device 130, and automatically download the preferences stored in the memory 210 of the computer input device 100 or prompt the user to enter his preferences.

The enter device 140, the display select device 145, and the parameter select device 150 produce an enter signal, a display select signal, and a parameter select signal, respectively. These signals are typically analog signals. For example, if the enter device 140 is a switch connected to a voltage potential, then the enter signal will vary between two voltage potentials. Alternatively, these signals could be implemented as digital, optical, etc. signals.

The memory 210 stores the preferences of the user. The memory 210 can be any type of device that stores data. The memory 210 can be powered from within the computer input device 100, such as from a battery, or the memory 210 can be powered from an external source via the data port 135. If power is supplied from an external source, then power will be disconnected from the computer input device 100 when the user is in transit. In this case, the memory 210 is non-volatile. Examples of non-volatile memory 210 include EEPROM, and flash RAM.

The preferences stored in the memory 210 are utilized by the computer 110 to set the desired operational characteristics of the display device 115, the computer input device 100, and the user environment, for example. The preferences downloaded to the computer 110 from the computer input device 100 provide the desired operational characteristics for the user regardless of which computer 110 the user is utilizing. Examples of preferences include pointing device preferences, display device preferences, and environmental preferences. Examples of pointing device preferences include the speed of the cursor movement across the display device 115, and the shape of the cursor displayed on the display device 115. Examples of display device preferences include a plain versus a textured background on the display device 115, and selecting which area of the display device 115 corresponds to, for example, each switch in the display select device 145. Examples of environmental preferences include such things as cockpit lighting levels, cockpit temperature levels, a flight plan, and the desired operational characteristics of any other devices and systems that the computer 110 controls, such as a conveyer belt.

The preferences typically are selected by the user in response to prompts displayed on the display device 115. The prompts can be generated by the preference setup routine run by the computer 110 or run by the processor 215. As the user selects his preferences, the preferences typically are processed by the computer 110 and/or the processor 215 and transferred to the memory 210. If the user previously selected and stored his preferences in memory 210, then the user can skip the setup routine and download his preferences from the memory 210 to the computer 110.

The processor 215 converts any analog signals to digital signals, inserts the digital signals into a data stream formatted to be compatible with the device that is receiving the digital signals, such as the computer 110, and performs any other processing that may be desired, such as running the preference setup routine. Some or all of the digital signals from the computer input device 100 may not need to be formatted, depending on the requirements of the computer 110. In that case, those signals can be coupled to the computer 110 without being processed by the processor 215. The processor 215 can be implemented with any type of device that performs a processing function, such as gate arrays, microprocessors, microcontrollers, etc.

Although certain aspects of the invention have been described herein in conjunction with the appended drawings, those skilled in the art will appreciate that the scope of the invention is not so limited. Modifications in the selection, design, and arrangement of the various components and steps discussed herein may be made without departing from the scope of the invention as set forth in the appended claims.

What is claimed is:

1. The computer input device for use in an aircraft comprising:

a housing capable of accommodating a plurality of types of pointing devices;

a data port for communicatively coupling said computer input device to a computer, wherein said data port is attached to said housing;

a pointing device for producing a cursor control signal that controls the movement of a cursor on the display device coupled to the computer, wherein said pointing device is partially housed in said housing, wherein said pointing device is one of the plurality of types of pointing devices, and wherein the curser control signal is communicated to the computer via said data port;

a memory for storing preferences of the user, wherein said memory is housed in said housing, and wherein the preferences are communicated to the computer via said data port;

an enter device for producing an enter signal that controls selection of an item on the display device, wherein said enter device is partially housed in said housing, and wherein the enter signal is communicated to the computer via said data port;

a display select device for producing a display select signal that controls selection of an area of the display device in which the movement of the cursor is controlled, wherein said display select device is partially housed in said housing, and wherein the display select signal is communicated to the computer via said data port; and wherein said computer input device is portable.

2. The computer input device of claim 1, wherein said housing is detachably affixed to a base substantially fixed relative to a user during use of said computer input device.

3. The computer input device of claim 2, wherein said data port comprises a connector for detachably coupling said computer input device to the computer.

4. The computer input device of claim 1, wherein the preferences comprise pointing device preferences.

5. The computer input device of claim 1, wherein the preferences comprise display device preferences.

6. The computer input device of claim 1 further comprising:

a parameter select device for producing a parameter select signal that controls scrolling through a list of parameters on the display device, wherein said parameter select device is partially housed in said housing, and wherein the parameter select signal is communicated to the computer via said data port.

7. A computer input device for use in an aircraft comprising:

a housing capable of accommodating a plurality of types of pointing devices;

a data port for communicatively coupling said computer input device to a computer, wherein said data port is attached to said housing;

a pointing device for producing a cursor control signal that controls the movement of a cursor on a display device coupled to the computer, wherein said pointing device is partially housed in said housing, wherein said pointing device is one of the plurality of types of pointing devices, and wherein the cursor control signal is communicated to the computer via said data port;

a memory for storing preferences of the user, wherein said memory is housed in said housing, and wherein the preferences are communicated to the computer via said data port;

an enter device for producing an enter signal that controls selection of an item on the display device, wherein said enter device is partially housed in said housing, and wherein the enter signal is communicated to the computer via said data port a parameter select device for producing a parameter select signal that controls scrolling through a list of parameters on the display device, wherein said parameter select device is partially housed in said housing, and wherein the parameter select signal is communicated to the computer via said data port; and wherein said computer input device is portable.

8. The computer input device of claim 7 further comprising:

a display select device for producing a display select signal that controls selection of an area of the display device in which the movement of the cursor is controlled, wherein said display select device is partially housed in said housing, and wherein the display select signal is communicated to the computer via said data port.

9. The computer input device of claim 7, wherein said housing is detachably affixed to a base substantially fixed relative to a user during use of said computer input device.

10. The computer input device of claim 9, wherein said data port comprises a connector for detachably coupling said computer input device to the computer.

11. The computer input device of claim 7, wherein the preferences comprise pointing device preferences.

12. The computer input device of claim 7, wherein the preferences comprise display device preferences.

* * * * *